United States Patent Office 2,748,171
Patented May 29, 1956

2,748,171

PROCESS OF MANUFACTURING MONO-ALKYL ETHERS OF ETHYLENE GLYCOL AND OF POLYETHYLENE GLYCOLS

Gaylord K. Finch and Hugh J. Hagemeyer, Jr., Kingsport, Tenn., assignors to Eastman Kodak Company, Rochester, N. Y., a corporation of New Jersey No Drawing. Application September 12, 1952, Serial No. 309,356

2 Claims. (Cl. 260—615)

This invention relates to the manufacture of lower mono-alkyl ethers of ethylene glycol and polyethylene glycols. More particularly, it relates to the manufacture of such ethers from alcohols and ethylene oxide. It has been known to prepare lower mono-alkyl ethers of ethylene glycol and polyethylene glycols from lower aliphatic monohydric alcohols and ethylene oxide in the presence of a catalyst, such as sulfuric acid, but the known processes of carrying out such preparations have always involved the use of high temperatures and high pressures.

We have found that good yields of a lower mono-alkyl ether of ethylene glycol can be obtained at approximately atmospheric pressure by cooling ethylene oxide to the liquid state and feeding the cold, liquid ethylene oxide into a lower monohydric aliphatic alcohol, in the presence of sulfuric acid as a catalyst. The liquid ethylene oxide can be safely added at a rapid rate and completely reacted in a very short time, being absorbed and reacted before it can vaporize. It may be either fed below the surface of the alcohol, or dropped onto the surface of the alcohol.

The reaction may be illustrated by the following equations:

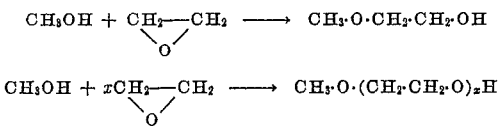

Some mono-alkyl ethers of polyethylene glycols are formed along with the mono-alkyl ether of ethylene glycol. When we desire to form preponderantly the mon-alkyl ether of ethylene glycol, we use a high molar ratio of alcohol to ethylene oxide. We have found that as this ratio decreases, the percentage of high boilers formed increases, as shown by the figures below:

| mole ratio methyl alcohol/ethylene oxide | 12.1 | 5.8 | 2.5 |
| --- | --- | --- | --- |
| weight ratio 2-methoxyethanol/high boilers | 6.5 | 5.4 | 2.5 |

We have found that some sulfuric acid is used up during the reaction, evidently by a side reaction. We therefore prefer to add part of the sulfuric acid catalyst to the initial charge of alcohol, and to feed in sulfuric acid during the reaction at such a rate as to keep the pH of the reaction mixture below 1.0, preferably below 0.4. The concentration of sulfuric acid in the reaction mixture should be maintained at 0.2%–2.0% by weight. In this way, higher yields are obtained than by adding all the sulfuric acid in the beginning.

The reaction can be carried out at any temperature between 0° C. and the boiling point of the alcohol. The higher the temperature in the reaction vessel, the lower should be the temperature of the liquid ethylene oxide fed in, so that the ethylene oxide will not flash off before it reacts. When the desired product is a mono-ether of ethylene glycol, we prefer to use a reaction temperature below 30° C., as the ratio of the mono-ether of ethylene glycol to high boilers increases as the reaction temperature decreases. For example, at a 3/1 mole ratio of methanol to ethylene oxide, the ratio of 2-methoxyethanol to high boilers was found to be 4.1/1 at a reaction temperature of 23° C., as compared to 2.5/1 at a reaction temperature of 64° C.

When it is desired to form mono-ethers of polyethylene glycols, a lower molar ratio of alcohol to ethylene oxide may be used; and/or a higher temperature may be used; or the reaction may be continued, with the addition of further ethylene oxide and sulfuric acid, after the 2-alkoxyethanol is formed. Alternatively, alkoxyethanol may be used as the starting material, in place of alcohol.

We may use any lower aliphatic monohydroxy alcohol (methanol, ethanol, propanol, butanol, pentanol or hexanol), or, when a lower monoalkyl ether of a polyethylene glycol is to be formed, we may use a lower alkoxyethanol, such as the mono-methyl, ethyl, propyl, butyl, amyl or hexyl ether of ethylene glycol.

After the desired amount of ethylene oxide has been added, the excess alcohol is distilled off for re-use, and the glycol monoethers are separated by vacuum distillation.

By way of illustrating our invention, we give the following examples. Example 1 illustrates a batch method of carrying out the process; Example 2 illustrates a continuous method.

*Example 1.*—A closed kettle with circulating pump and heat exchanger was charged with 200 gallons of methanol (40 mols) and 6.6 pounds of concentrated sulfuric acid, which gave a pH below 0.2. The system was flushed with nitrogen until the oxygen content of the gas was below 1.5%, and 0.5 p. s. i. g. of nitrogen pressure was left on the system. 350 pounds (8 mols) of ethylene oxide, liquefied by cooling in a liquid carbon dioxide-acetone bath, was run into the kettle at such a rate that the temperature was kept below 30° C. A mixture of 9 pounds of concentrated sulfuric acid in 5 gallons of methanol was fed to the suction side of the pump at such a rate that 0.5–1.0 pound of sulfuric acid was added per 100 pounds of ethylene oxide, and the pH remained below 0.2. The product was stripped of methanol by distillation at atmospheric pressure, and fractionally distilled under reduced pressure. An 80% yield of 2-methoxyethanol (the monomethyl ether of ethylene glycol) was obtained, based on the ethylene oxide added to the reaction kettle. A small amount of 2-(2-methoxyethoxy)-ethanol (the monomethyl ether of diethylene glycol) was also obtained.

*Example 2.*—A small continuous reactor consisting of a holdup tank with a heat exchanger and circulating pump was charged with 1588 g. of methanol containing 7.9 g. of concentrated sulfuric acid. Methanol and liquid ethylene oxide in the ratio of 640 g./308 g. were fed separately at the suction side of the pump at a rate that gave a reaction time of one hour (this can be much less), and a mixture of 10 g. of concentrated sulfuric acid in 64 g. of methanol was added at the rate of 0.5 g. of sulfuric acid per 100 g. of feed. The product was overflowed to a still where the excess methanol was removed, and the product was distilled under reduced pressure. An 82% yield (based on the ethylene oxide added) of methoxyethanol was obtained. A small amount of 2-(2-methoxyethoxy)-ethanol was also obtained.

What we claim as our invention and desire to be secured by Letters Patent of the United States is:

1. A process of manufacturing the mono-methyl ether of ethylene glycol, which comprises cooling ethylene oxide to the liquid state and feeding the cold, liquid ethylene oxide onto the surface of an excess of methanol of the order of 400%, in the presence of sulfuric acid as a catalyst, while keeping the temperature of the reaction mixture between 0° C. and 30° C., and maintaining the pH of the reaction mixture at a value below 1.0, by adding sulfuric acid to the initial charge of methanol and continuously feeding in sulfuric acid during the reaction, the content of sulfuric acid in the reaction mixture being maintained within the range of 0.2% to 2.0% by weight.

2. A process of manufacturing a lower mono-alkyl ether of ethylene glycol at approximately atmospheric pressure, which comprises cooling ethylene oxide to the liquid state and feeding the cold, liquid ethylene oxide into a lower monohydric aliphatic alcohol, in the presence of sulfuric acid as a catalyst, while keeping the temperature of the reaction mixture between 0° C. and 30° C., and maintaining the pH of the reaction mixture at a value below 1.0, by adding sulfuric acid to the initial charge of alcohol and continuously feeding in sulfuric acid during the reaction, the content of sulfuric acid in the reaction mixture being maintained within the range of 0.2% to 2.0% by weight.

References Cited in the file of this patent

UNITED STATES PATENTS

| | | |
|---|---|---|
| 2,554,667 | De Groote | May 29, 1951 |
| 2,637,740 | Kosmin | May 5, 1953 |

FOREIGN PATENTS

| | | |
|---|---|---|
| 271,169 | Great Britain | May 23, 1927 |

OTHER REFERENCES

Fieser et al.: Organic Chemistry (1944), D. C. Heath & Co., Boston, p. 125.